(No Model.) 2 Sheets—Sheet 1.
L. M. KORDS.
CAMERA SHUTTER.
No. 477,012. Patented June 14, 1892.
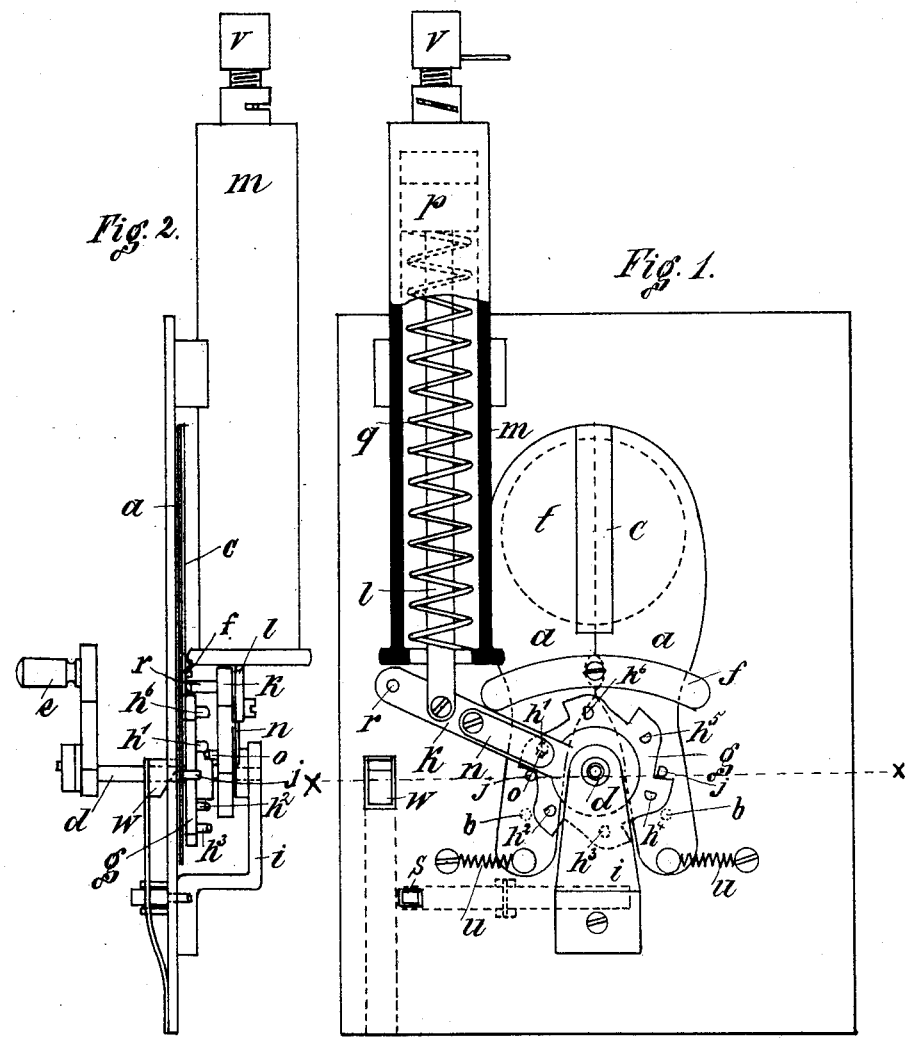
Witnesses:
E. B. Bolton
H. Kusterer
Inventor
L. M. Kords
By Richards
his Attorneys.

(No Model.) 2 Sheets—Sheet 2.
L. M. KORDS.
CAMERA SHUTTER.
No. 477,012. Patented June 14, 1892.
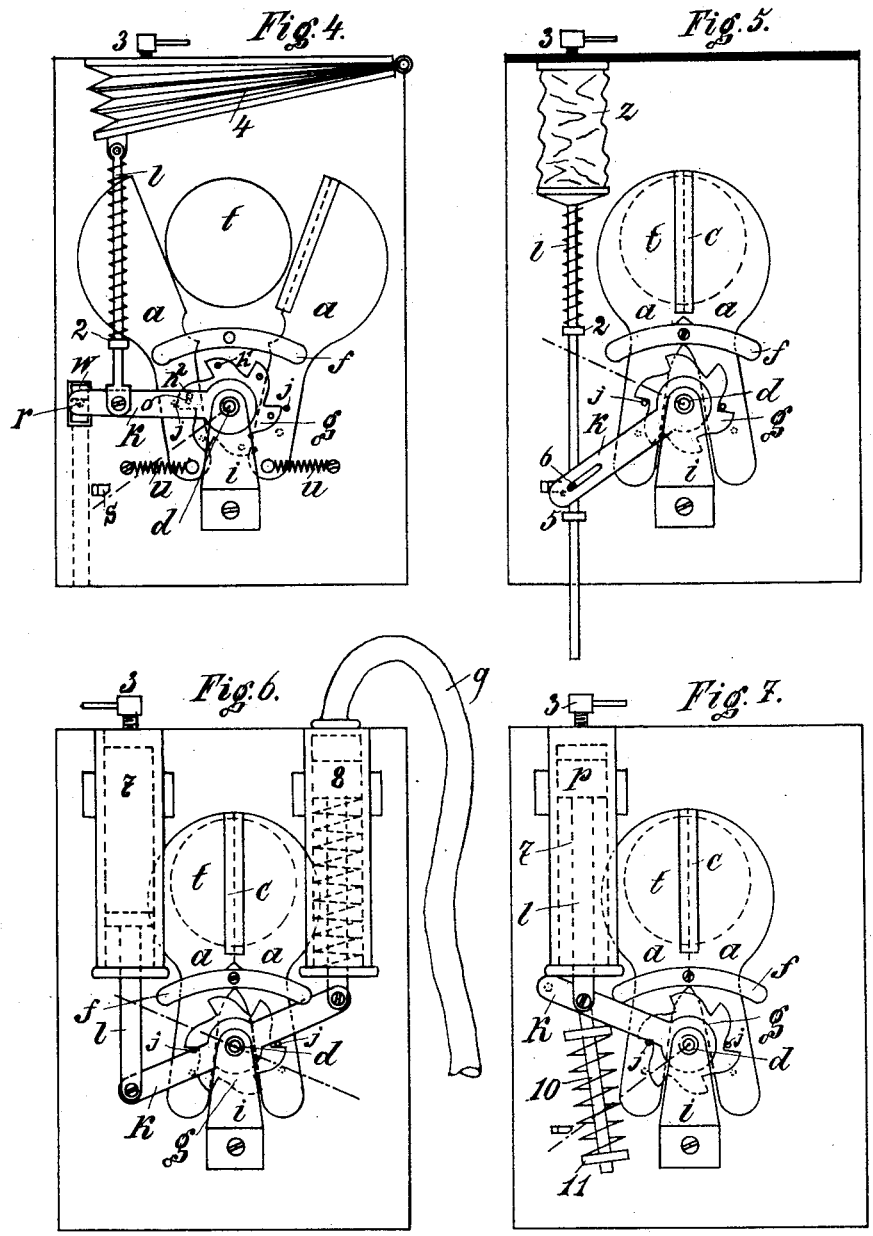
Witnesses:
E. B. Bolton
H. Kustrer.
Inventor:
L. M. Kords
By Richards
his Attorneys.

United States Patent Office.

LOUIS M. KORDS, OF MUNICH, GERMANY.

CAMERA-SHUTTER.

SPECIFICATION forming part of Letters Patent No. 477,012, dated June 14, 1892.

Application filed September 22, 1891. Serial No. 406,459. (No model.)

*To all whom it may concern:*

Be it known that I, LOUIS M. KORDS, a citizen of the United States, residing at Munich, Bavaria, Germany, have invented certain new and useful Improvements in Camera-Shutters, of which the following is a specification.

By means of the present invention "time" and "instantaneous" exposures can be made when the photographing and the duration of the exposure can be regulated at will. The result is that the closing-plates open very quickly and remain in this position during the desired length of exposure and quickly close again. The time of exposure itself is regulated pneumatically by pressure of air in either a cylinder, bellows, &c., properly connected with the shutter.

In the accompanying drawings, forming part of this specification, Figure 1 is a rear view of a shutter embodying my improvements. Fig. 2 is a side view of the same. Fig. 3 is a horizontal section of the same on line X X, Fig. 1. Figs. 4, 5, 6, and 7 show different forms of the brake arrangement of the shutter.

The latter consists of two thin plates $a$, formed as shown in the drawings, which are pivoted at $b$, Fig. 1, to the wall or base-plate and held close to the wall by a segment-shaped guide $f$. One of said plates $a$ is provided with an overlapping strip $c$ to render the shutter perfectly light-tight. Below the object-opening and between the lower ends of the plates $a$ $a$ a horizontal shaft $d$ is arranged, bearing at one end in the plate and at the other in an angle-shaped arm $i$, fastened to said front plate. Said shaft $a$ is provided with a crank $e$. $g$ is a toothed disk mounted on shaft $d$ and having one of the edges of each of its teeth formed as shown in Fig. 1. From the face of these teeth, at about the middle of the same, beveled pins $h'$ $h^2$, &c., project, while a pin $j$ projects from each of the plates $a$, so that when the shutter is closed it engages one of the notches presented by the teeth of the disk $g$, Fig. 1. Between the latter and the arm $i$ a lever $k$ is arranged, tightly connected with the shaft $d$, and with which lever the piston-rod $l$ of a brake-cylinder $m$ is movably connected. On the lever $k$ is a leaf-spring $n$, whose pin $o$, which is beveled in the opposite direction to that of the pins $h$, &c., going through a hole in the lever $k$ always engages one of the pins of the disk $g$, Figs. 1, 2, and 3. The setting of the shutter is effected by turning the crank $e$, whereupon the lever $k$, through the medium of the rod $l$, draws down the piston $p$, (which, although fitting snugly in the cylinder, is easily movable therein,) the result being that the spiral spring $q$ in the cylinder is compressed. The spring-pin $o$ then becomes disengaged from the pin $h'$, glides over the pin $h^2$, and is engaged behind pin $h^2$ by a pin $r$, fastened to the end of the lever and properly beveled, the engagement for which can be provided for by means of a spring-catch $s$ passing through the object-wall. If the spring-pawl $s$ is freed, the spiral spring $q$ throws the piston and rod $l$ upward, raising the lever $k$, while the pin $h^2$, together with the disk $g$, is carried along by the spring-pin $o$. Then the convex edges of the teeth of the disk $g$ act as cams on the pins $j$ of the small plates $a$ in that they press them outwardly on both sides—*i. e.*, apart, Fig. 4—whereby the opening is exposed.
The lower ends of the plates $a$ are each connected to one end of a spring $u$, the other end of which is secured to a screw in the wall, both of said springs serving to quickly close the plates after they have been actuated by the toothed wheel, the pins $j$ engaging successively each tooth on said wheel. The peculiar construction of this toothed wheel which engages the pin $j$ causes the plates to be suddenly opened and retained for a time in that position by the outer periphery of each tooth, and then as suddenly shut by the pin $j$ engaging the hollow formed by the teeth.

To regulate the working of the spring, there is an air-space above the piston $p$ of the cylinder $m$, the entrance of air into which is regulated by a screw-valve V, arranged on the cylinder. This valve may be of a suitable form, permitting of the graduation of the hole for the escape of air from the cylinder. In proportion to the limiting of the escape of air the action of the spring is resisted to a greater or less degree and the movements of the plates $a$ accordingly influenced. When long exposures are desired, the plates $a$ may be held open by the lever $k$ engaging a second pawl W. This pawl or catch consists of a bar-spring secured at one end to the plate and having on its upper end a bevel-headed pin $t$, passing through an opening in the plate and is engaged by the pin $r$ on the lever $k$. In taking instantaneous photographs this pawl lies so far back that the pin $r$ of a lever $k$ cannot touch it. Instead of working the shutter, as in the manner shown in Fig. 1, it may be done as shown in Figs. 4, 5, 6, and 7.

In the modification shown in Fig. 4, instead of a cylinder being used to regulate the closing of the plates, I may employ a pair of bellows of ordinary construction provided with a valve 3 to be used for the same purpose as valve V, Fig. 1.

In Fig. 5 the modification shown is somewhat similar to that illustrated in Fig. 4, in which a bellows is used. The rod $l$ in this case extends downward a considerable distance and is secured in place by two brackets or staples 2 and 5, through which it passes. Between these two staples and on the rod is a pin 6, which engages a slot in the lever $k$ to regulate the shutter through the connection of the lever and bellows.

In Fig. 6 a pair of cylinders 7 and 8 are used, a lever of the first class being fulcrumed on the shaft $d$. To one end of this lever is secured the piston-rod $l$, attached to a piston working in the cylinder 7. The other end of the lever also has a piston-rod and piston. A spring encircles this piston-rod and tends to hold the lever in the position shown. A flexible tube is connected to cylinder 8 to supply compressed air to the same, and thus force down the piston therein to rock the lever $k$ and open or close the shutter. This operation is regulated by means of the valve 3 in cylinder 7.

In Fig. 7 the same construction as in Fig. 1 is represented, with the exception that the spring for operating the lever $k$ is placed below the same and not in the cylinder.

Having thus described my invention, what I claim is—

1. In a photograph-camera shutter, the combination of the spring-closed pivoted plates having pins $j$, the rotary toothed disk $g$, having pins $h'\ h^2$, &c., a spring-operated lever $k$, having spring-pin $o$ and the pin $r$ on the end of the lever, and the spring-catch S, the whole operating substantially as set forth.

2. In a photograph-camera shutter, the combination of the spring-closed pivoted plates having pins $j$, the rotary toothed disk $g$, having pins $h'\ h^2$, &c., a spring-operated lever $k$, having spring-pin $o$ and the pin $r$ on the end of the lever, and spring-catches S and W, substantially as set forth.

3. In a photograph-camera shutter, the combination of the spring-closed pivoted plates $a$, having pins $j$, the shaft $d$, the toothed disk $g$, having pins $h'\ h^2$, &c., mounted on said shaft, a spring-operated lever K, rigidly secured to shaft $d$ and carrying a spring-controlled pin $o$, which co-operates with the pins $h'\ h^2$, &c., a cushioning device connecting with lever $k$, pin $r$ on the end of said lever, and spring-catch S, substantially as set forth.

4. In a photograph-camera shutter, the combination of the pivoted plates $a$, having pins $j$, the springs $u$ to normally close said plates, the shaft $d$, the toothed disk $g$, having pins $h'\ h^2$, &c., loosely mounted on said shaft, the lever $k$, rigidly secured to the shaft, the spring $n$ and pin $o$, carried by the lever, the cylinder M, having valve V, the spring $q$ and piston $p$, moving in said cylinder, the rod $l$, connecting the piston and lever $k$, the pin $r$ on the end of the lever, and catches W and S, the whole operating substantially as set forth.

In testimony that I claim the foregoing as my invention I have signed my name in presence of two subscribing witnesses.

L. M. KORDS.

Witnesses:
ALBERT WEICKMAN,
CARL MAYER.